Feb. 26, 1963  V. L. FALKNER ET AL  3,079,108
CONTROL APPARATUS
Filed Sept. 14, 1960  3 Sheets-Sheet 1

INVENTORS
VICTOR L. FALKNER
RUSSELL C. HENDRICK
BY ROBERT C. K. LEE

ATTORNEY

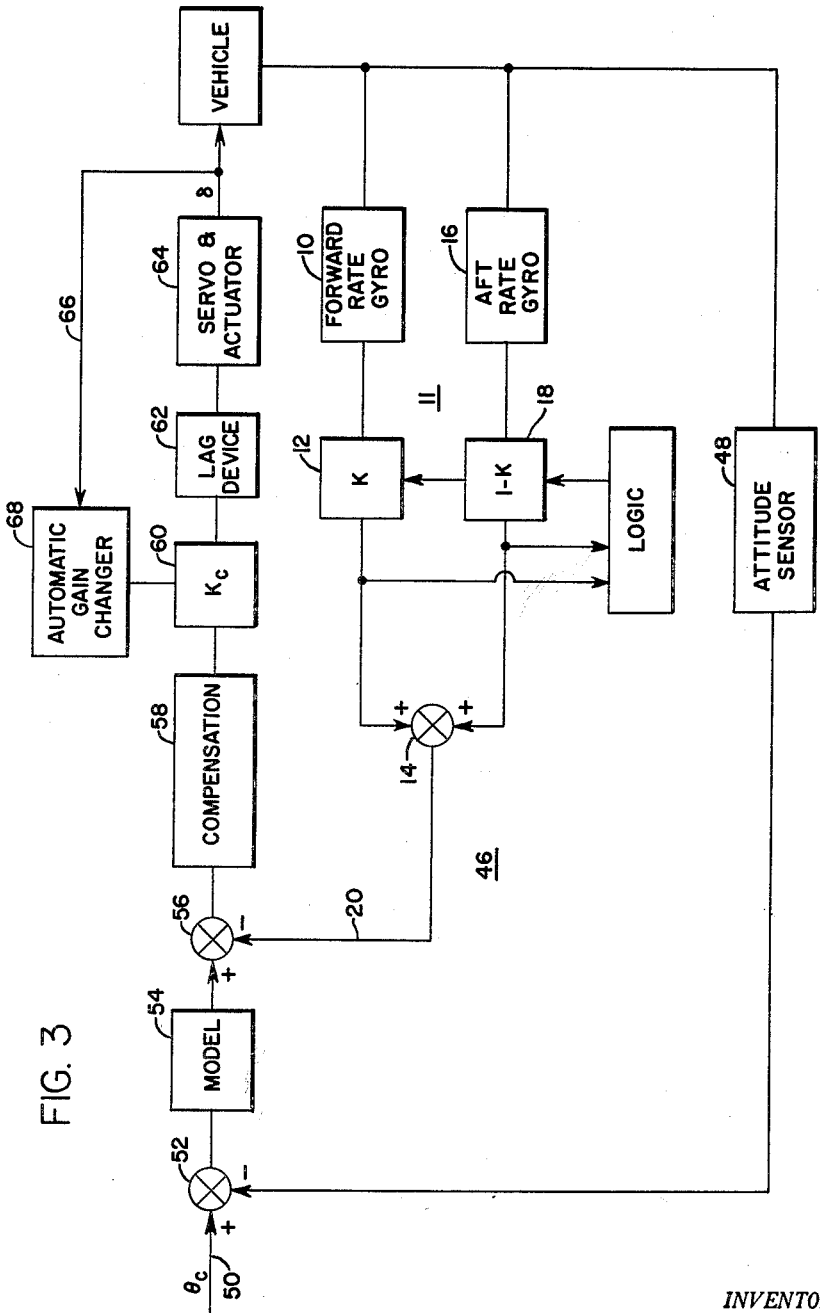

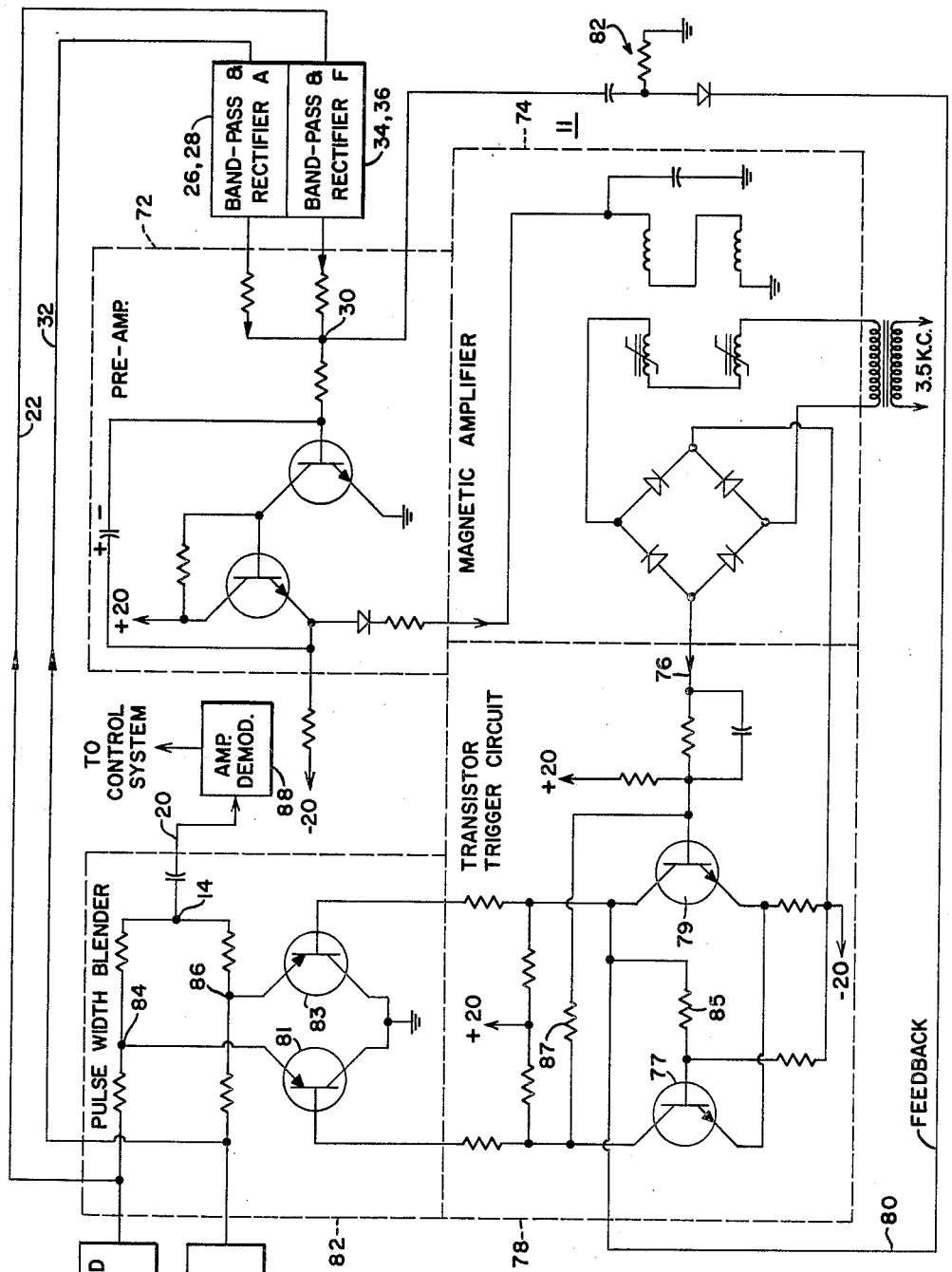

United States Patent Office 3,079,108
Patented Feb. 26, 1963

3,079,108
CONTROL APPARATUS
Victor L. Falkner, St. Paul, and Russell C. Hendrick and Robert C. K. Lee, Fridley, Minn., assignors to Minneapolis-Honeywell Regulator Company, Minneapolis, Minn., a corporation of Delaware
Filed Sept. 14, 1960, Ser. No. 55,916
15 Claims. (Cl. 244—77)

This invention relates to control apparatus for a dirigible craft of the aeroelastic type or similar body. For purposes of description only, the invention is herein shown in connection with control apparatus such as an automatic pilot that is connected to operate the control surface of an aircraft to control the movements of the craft about an axis thereof. Such craft is subject to external disturbing forces affecting flight conditions of the craft. In the particular application of the invention for purpose of disclosure thereof, such flight condition considered is the angular rate of the aircraft about its pitch or lateral axis. If the aircraft be of the aeroelastic type wherein it is subject to body bending when subject to said external disturbing forces, the input to an angular rate sensing device such as a rate gyroscope is affected not only by the rotation of the craft about its pitch or lateral axis but also by the body bending action of the craft.

The present invention is particularly directed to correcting this effect or condition in the control apparatus of a controlling sensor therefor which is responsive not only to the angular rate of the craft about its own axis but is also responsive to the body bending modes of the craft.

Further objects and advantages of the invention will be apparent from the following description when read in connection with the accompanying drawings, wherein FIG. 1A is a side view of an aeroelastic aircraft showing superimposed the first body bending mode shape;

FIG. 3 is a control apparatus of the adaptive type for an aircraft including the blender of FIG. 2;

FIG. 4 is an electrical schematic arrangement of the blender of FIGURE 2.

In automatic control apparatus such as automatic pilots for aircraft which include a flight condition sensor such as a rate gyroscope for sensing pitch rate of the aircraft, such rate gyroscope, if the craft being controlled is of the aeroelastic type, responds not only to the movement of the craft about an axis thereof but also to the body bending modes of the craft. In some instances for control purposes, a rate signal in accordance with a rigid body rather than an aeroelastic body may be desired although the rate sensor may actually be on a non-rigid craft. A gyro output blender is provided herein that automatically blends the outputs of two rate gyroscopes to obtain, if desired, any portion of first mode pickup. One rate gyroscope is placed forward and one aft of the first bending mode antinode. The "blender" is so arranged that it will not affect the rigid body output but will give a positive, negative or zero pickup for the first body bending mode depending on a selection made. The first bending mode is considered more significant than other higher modes in control apparatus.

The first body bending mode rather than the higher modes is by far the most important in the design of an automatic control apparatus for large aircraft or large elastic boosters. By the use of such "blender" excellent control performance of such vehicle may be obtained throughout its flight range.

Figure 1A:
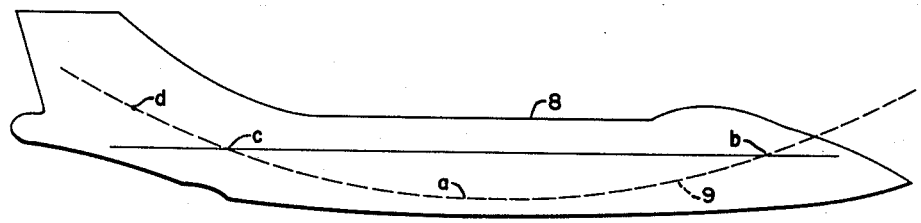
FIG. 1B is a slope curve of such bending mode.

Reference is made to FIGURE 1A in connection with a brief consideration of aeroelastic type aircraft. The aircraft is shown in a side view in full outline while not undergoing body bending and the dashed line indicates a bending action thereof. In the following consideration, it is to be understood that the aircraft is taken as an unrestrained body or what is often known as a free-free beam. Further, bending of the aircraft is considered only for the first bending mode. In response to disturbances or changes in attitude caused by operation of the attitude changing means of the craft or by exterior disturbances, the aircraft may undergo a first bending mode as shown in dashed line FIG. 1A. The lowest point of the theoretical flexure or bending is termed the antinode, and the points where the curve crosses the normal neutral axis of the aircraft are termed the nodes. Nodes are considered the points of no vibration or zero displacement on the aircraft while undergoing the first body bending mode. Thus, the antinode on the curve in FIG. 1A may be identified by the letter $a$ and the two nodes by $b$ and $c$. It will be realized that if the disturbing force is applied to the aircraft in the opposite direction that the bending curve will be inverted from that shown in FIG. 1A.

Figure 1B:
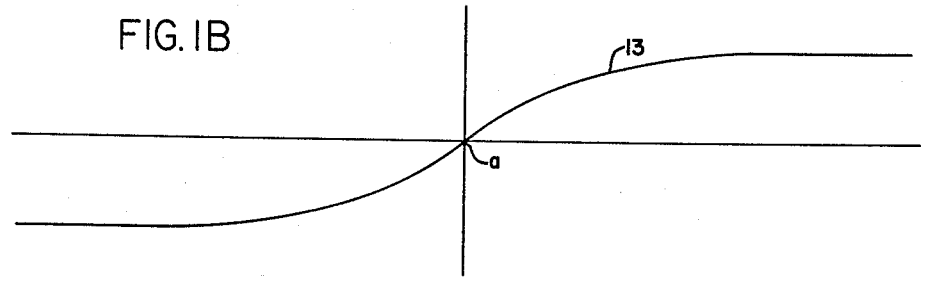

It will be apparent that for the body bending curve of FIG. 1A that one may plot a second curve as in FIG. 1B wherein the ordinates of the curve are the degrees slope for the corresponding points of the bending curve of FIGURE 1A. In such second curve, the antinode $a$ would have a zero slope and thus would be on the origin.

If a rate gyroscope were positioned between $a$ and $b$ on the aircraft to sense say pitch rate of the craft, it is affected not only by the angular motion about the craft pitch axis but also by the body bending action. The present invention is concerned with compensating for the body bending effect on a flight condition sensor of an aircraft which in the present embodiment is illustrated by a rate sensor. Compensation is provided herein by locating one rate gyroscope forwardly of the antinode $a$ of the craft and a second gyroscope aft of the antinode $a$ of the aircraft first body bending mode antinode. As stated, the flight condition sensors are taken as rate gyroscopes for sensing pitch rate of the craft. Depending upon which direction the deflection of the body the aircraft assumes or undergoes, one rate gyroscope has an output signal that lags the actual angular rate of the craft about its axis whereas the other rate gyroscope has an output signal that leads the angular rate of the aircraft about its axis.

For the craft bending deformation for the first mode as shown in FIG. 1A and if the craft were pitching upwardly, then with respect to the forward rate gyroscope, the pitch rate due to the body bending would be in phase with the actual craft angular rate sensed by the forward rate gyroscope. On the other hand, with respect to the aft rate gyroscope, the structural deflection of the craft has an effect on the rate gyroscope of contributing pitch rate due to body bending out of phase with the actual craft angular rate sensed by the aft rate gyroscope.

To illustrate the effect of the body bending on a simple pitch rate control system consider the following. If it were desired to pitch the aircraft upwardly, it would be necessary to deflect the elevator upwardly. For an upward deflection of the elevator, the first body mode bending deformation shown in FIG. 1A will be inverted. Thus the pitch rate sensed by the forward rate gyroscope will be less than the actual craft angular rate and consequently the forward rate gyroscope signal lags in phase angle, the actual angular rate of the craft for a control input. On the other hand, with respect to the aft rate gyroscope, the pitch rate sensed will be greater than the actual angular rate of the craft and consequently the aft rate gyroscope signal leads in phase angle the actual angular rate of the craft for a control input. With respect to the front gyro, the effect on the gyro due to body bending is of opposite phase to the effect due to tilt of the craft upwardly about the pitch axis. On the other hand, for the rear gyro, the body bending effect is in phase with the tilt of the craft downwardly. It is assumed the craft center of gravity is generally close to the antinode, thus the craft would rotate counterclockwise about the antinode for the above condition of elevator deflection.

By combining the signal outputs of the forward and aft rate gyroscopes above, the body bending effect of the first mode may be cancelled. On the other hand, by suitable gains for each of the respective rate gyroscope signals the resultant signal may be made to include either a lagging or a leading component of the signal due to body bending. An arrangement for effecting the combining of the two signals from the forward and aft rate gyroscopes is shown in FIGURE 2.

Figure 2:
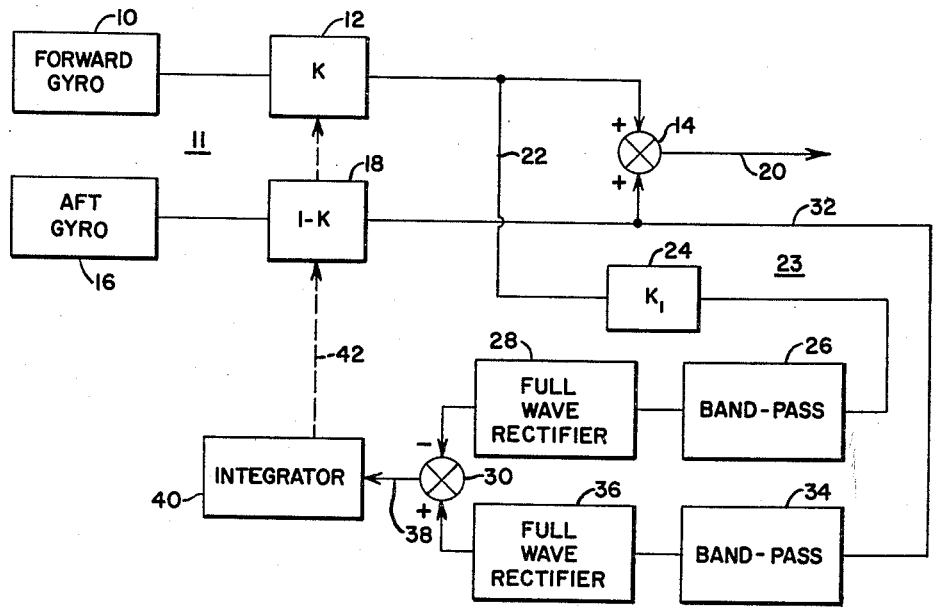
FIG. 2 is a block diagram of a blender and logic circuit for correcting a pitch rate sensor response.

FIGURE 2 comprises a forward rate gyroscope 10 positioned forward of the antinode $a$ of FIGURE 1 and has its its output signal which as conventional may be obtained from a potentiometer supplied through a multiplying device 12, for example a potentiometer type voltage divider, to a summing device 14. An aft rate gyroscope 16 similarly has its output signal supplied to a multiplier 18 which has its output supplied to the summing device 14. The output from the summing device 14 is supplied through transmitting means 20 to an automatic control system to be described. The output from the multiplying device 12 is also transmitted through conductor means 22 to an attenuator arrangement 24 such as a variable resistor in turn having its output supplied to a band-pass filter 26. The output of the filter 26 is supplied to a full wave rectifier 28 and thence to a summing device 30. The output of the multiplier device 18 is also transmitted by means 32 to a second band-pass filter 34 having its output in turn supplied to a second full wave rectifier 36. The output of the rectifier 36 is supplied to the summing device 30. The output of summing device 30 through transmitting means 38 is supplied to an electronic integrator 40 which may comprise a motor operable as long as device 30 supplies an output thereto which has its output applied through motion transmitting means 42 to adjust multiplying devices 18 and 12 for adjusting gain or the proportion of forward and aft gyro signals utilized. The two band-pass filters 26, 34 are centered at the first bending mode frequency, and the rectifiers 28, 36 provide absolute values of one polarity or another, or positive or negative.

The arrangement 23 which herein defines FIGURE 2 is termed a gyro output blender, and it serves to blend the control signals from the forward gyroscope 10 and the aft gyroscope 16. We may assume that the desired output on transmitting means 20 consists of a resultant signal having a slight component lagged with respect to the actual rigid aircraft angular velocity thus it includes a slight body bending effect; in other words, the resultant signal is slightly lagged with respect to the actual rigid aircraft angular rate. To effect this, the attenuator 24 which may be a variable resistor is manually adjusted as selected. Thereafter the integrator motor 40 operates to adjust the multiplying devices 12 and 18 to maintain the desired output on transmititng means 20.

Due to the fact that the position of the antinode $a$ may shift longitudinally of the craft, the blender 23 through its operating means 40 continually or when necessary readjusts the multiplying devices 12 and 18 to maintain the desired output on transmitting means 20. When the outputs from rectifying means 28 and 36 are equal and opposite and are thus summed on summing device 30, the operation of integrator 40 is terminated and the multiplying devices 12 and 18 remain as adjusted.

The following mathematical analysis is given of the blender arrangement of FIGURE 2 wherein the blender output $G_0$ appears on transmission means 20. It is assumed that the analysis below is based on the body axis system of the aircraft. Furthermore, the subscripts "F" and "A" below refer to the forward and aft gyroscope positions relative to the antinode $a$. With respect to the mathematical notation below, $\lambda$ equals the bending slope in degrees at the point considered for one foot of deflection of the body taken at a reference point $d$. Such deflection at $d$ is termed in the mathematical notation $q$. Thus, $\dot{q}$ equals the rate of deflection of $q$.

For a particular loading, the craft may have a particular maximum bending deflection. If the loading is halved, the deflection $q$ also is halved. With the deflection halved, the actual bending slope is correspondingly reduced. In other words, if the bending slope at the point under consideration, for one foot lateral deflection at a reference point $d$, were 30 degrees, and thus 30 degrees per foot deflection then if the deflection $q$ at point $d$ were halved, the actual bending slope would be 15 degrees. The corresponding ratio holds for all points of the deflection beam. In other words, the actual slope is halved, except at the antinode, if the deflection is halved at point $d$.

(1) BLENDER OUTPUT $G_0$ (a) $\quad G_1 = \dot{\theta} + \sum_{i=1}^{3} \lambda_{iF} \dot{q}i =$ Forward Gyro I output the term after $\dot{\theta}$ is the rate due to bending and dimensionally is $$\frac{\text{degrees}}{\text{ft.}} \cdot \frac{\text{ft.}}{\text{sec.}} = \frac{\text{degrees}}{\text{sec.}}$$

(b) $\quad G_2 = \dot{\theta} + \sum_{i=1}^{3} \lambda_{iA} \dot{q}i =$ Aft Gyro output (c) $\quad \therefore G_0 = KG_1 + (1-K)G_2 = \dot{\theta} \sum_{i=1}^{3} \lambda'_i \dot{q}i$ where $\lambda'_i = K\lambda_{iF} + (1-K)\lambda_{iA}$ and the limits $i=1, 3$ are the first three body bending frequencies.

Now if $\lambda_{iF}$ and $\lambda_{iA}$ are of opposite signs, $\lambda'$ can be made to be any value between $\lambda_{iF}$ and $\lambda_{iA}$ by changing the variable K.

(2) BLENDER LOGIC

The blender logic circuit senses the output $K\lambda_{iF}\dot{q}i$ and $(1-K)\lambda_{iA}\dot{q}i$. Two band pass filters are used to discriminate all other frequencies from that of the 1st mode. In other words, the blender logic is primarily sensitive to $K\lambda_{iF}\dot{q}i$ and $(1-K)\lambda_{iA}\dot{q}i$. The outputs of the band passes are then rectified and compared. (See FIG. 2.) The difference is used to drive a servo or electronic multiplier which will change K until the difference becomes zero. In which case, $K\lambda_{iF} + (1-K)\lambda_{iA} = 0$ thus eliminating the effect of body bending from transmitting means 20. If it is desired that $\lambda'_1$ be always of one sign and its amplitude be small but not zero (it is advantageous to do this in some cases), then an attenuator $K_1$ could be used as shown in FIGURE 2. The relationship is as follows for positive $\lambda'_1$.

*Logic*

(d) $\quad |K_1 K \lambda_{1F} \dot{q}i| - |(1-K) \lambda_{1A} \dot{q}i| = 0$ (e) $\quad |K_1 K \lambda_{1F}| = |(1-K)| |\lambda_{1A}|$ (f) $\quad K(|K_1 \lambda_{1F}| + |\lambda_{1A}|) = +|\lambda_{1A}|$ (g) $\quad K = \frac{|\lambda_{1A}|}{|K_1 \lambda_{1F}| + |\lambda_{1A}|}$ (h)
$$\therefore \lambda'_1 = K\lambda_{1F} + (1-K)\lambda_{1A}$$
$$= \frac{|\lambda_{1A}|\lambda_{1F}}{|K_1\lambda_{1F}| + |\lambda_{1A}|} + \frac{|K_1\lambda_{1F}|\lambda_{1A}}{|K_1\lambda_{1F}| + |\lambda_{1A}|}$$

(k)
$$\lambda'_1 = \frac{(1-K_1)\lambda_{1F}\lambda_{1A}}{|K_1\lambda_{1F}| + |\lambda_{1A}|}$$

$\lambda_{1F}$ always positive if $\lambda_{1A}$ always negative.

To make $\lambda'_1$ always small but negative (stabilizing) put $K_1$ in gyro A output instead. If $K_1=1$, no first bending mode effect is present in the output means 20.

The blender of FIGURE 2 is incorporated or included in a control system 46 shown in block diagram in FIG. 3. The control system, in which the blender of FIGURE 2 is included, in FIGURE 3 may be an adaptive type of control system more fully disclosed in a prior application of Remus N. Bretoi, Serial No. 12,055, filed March 1, 1960. The control system 46 of FIG. 3 in addition to the blender of FIGURE 2 comprises an attitude sensing device 48 and an attitude command device 50. The outputs of the two devices is summed at device 52 and applied to an analog model 54 whose output represents the desired response of the craft. This output is summed with the blender output on transmitting means 20 at summing device 56. The output from device 56 represents an error signal which is transmitted through phase compensation arrangement 58 to the gain amplifier 60 whose output is transmitted through a lag network 62, corresponding to network 55 of the aforesaid Bretoi application, to a servo and actuator combination 64. The output from the servo and actuator is fed back through a transmission means 66 to an automatic gain changer 68 which in turn controls the gain of amplifier 60. The operation of the actuator is transmitted to an attitude changing means of the craft such as an elevator surface of an aircraft to effect change in attitude thereof.

While various instrumentalities may be utilized to fabricate the rate gyroscope signal blender 23 of FIG. 2, in view of the fact that the control system 46 in which it has been incorporated is of the electrical type, the blender also has been embodied in electrical schematic form in FIG. 4. The blender of FIG. 4 comprises a multiplying arrangement similar to the multiplying arrangement 18, and 12 of FIG. 2. In FIG. 4 there is provided a preamplifier 72 which receives a control voltage from summing point 30 corresponding with summing point 30 of FIG. 2. The output of the preamplifier is supplied to a saturable reactor or magnetic amplifier 74 which in turn has its output supplied through conductor 76 to a transistor trigger or flip-flop circuit 78. A feedback from transistor circuit 78 is supplied through conductor 80 and rate network 82 to summing point 30 to supply an integration effect. The transistor trigger circuit 78 controls a pulse width blender 82 so as to alternately ground terminals 84, 86. Circuit 76 comprises transistors 77, 79 which respectively control the conduction in transistors 81, 83 of blender 84. When the signal on conductor 76 is a maximum, the conduction of transistor 79 is a maximum and so is the conduction in transistor 83; however, when the signal on conductor 76 is a minimum such as zero, transistors 77, 81 have their maximum conduction. As conventional, the conduction in transistor 79 through resistor 85 reduces the conduction of transistor 77; and the conduction through transistor 77 for small input signals on conductor 76, through resistor 87 reduces the conduction in transistor 79.

It will be apparent that if point 84 is maintained continually at ground potential that there is no output from rate gyro 10 to summing device 14, and it is equally apparent that if the ground is applied to terminal 86 that there will be no output from gyro 16 to summing device 14. The trigger circuit 78 operates functionally like integrator 40, FIG. 2, in increasing one gain while reducing the other so that the time during which ground is applied to terminals 84 and 86 is relatively varied so that the signal summed at point 14 is either a preponderant signal from gyro 16 or from gyro 10. Thus the effects of both rate gyro signals are supplied over transmitting means 20 and through amplifier demodulator 88 to the adaptive control system of FIGURE 3. Thus, the output of the blender and logic circuit of FIGURE 4 is applied to the summation device 56 of FIG. 3 which relates to the entire control system.

While the blender has been illustrated as incorporated in an adaptive type automatic control system, which is of the non-linear type, the blender may also be included in a linear type of automatic control system. Such linear type automatic control system may be an autopilot for an aircraft wherein the rate of operation of a servomotor that positions a control surface is in accordance with the magnitude of an error signal that controls such servomotor.

Operation of the blender and logic circuit of FIGURE 2 may be considered in conjunction with the mathematical analysis relating thereto. It will be appreciated from FIGURE 1A that for various forces applied to the aircraft structure that the deflection will vary with the applied force. It has been determined what the bending slope $\lambda$ is at all points along the bending curve for a one foot deflection at a selected point $d$. As stated, such deflection is termed "$q$" and the rate of deflection "$\dot{q}$." As for the values of the quantities at positions of the rate gyroscope 10, 16, the slope $\lambda$ is given for the one foot deflection at the selected point $d$. If the load increases on the body and the deflection increases, the basic deflection at the point $d$ also increases. If the deflection be twice as great, the slope $\lambda$ all along the body bending curve will be twice as great.

In the particular illustration of FIGURE 2, we are primarily interested in the effects on the rate signal of the first body bending mode. Hence, the band-pass filters are responsive or filter only the first body bending mode frequencies. Although the band-pass filters connected to gyros 10, 16 are merely concerned with passing the first body bending mode frequencies, it is also apparent that the output from the blender 84 includes on transmission means 20 not only effects due to the first body bending mode but also effect due to the second and third body bending modes if present since the blender does not filter the gyro signals.

In the arrangement of FIGURE 2, the setting of K and $1-K$ may be appropriate for a given position of the antinode $a$. However, the position of the antinode may vary in the direction of the longitudinal axis of the aircraft. In such situation, the responses of the forward and aft gyroscopes would be different from what they were prior to such change in position of the antinode. By referring to the mathematical analysis, it is apparent that the values of K and $1-K$ also must be varied because of such change in position of the antinode.

The blender logic circuit comprising elements 26, 28, 30, 34, 36, 40 thereof through the integrator of FIGURE 2 continues to vary the values of the quantities K and $1-K$ to cause $\lambda'_1$ to correspond to the mathematical analysis. In an extreme case which is quite unlikely to happen, if the antinode should shift so that it is adjacent a point of a rate gyroscope, it is quite evident that Equation $k$ reduces to zero since $\lambda$ is zero for the gyro. In such event, the motor means 40 of FIGURE 2 operates to change K and $1-K$ so that no effect due to the first bending mode is transmitted to the control system. In other words the K would be altered so that the gyroscope at the antinode would be supplying the control system with the rate signal.

The above is clear from FIGURE 2 by assuming the forward rate gyroscope at the antinode. In such event there would be no first body bending mode signal on the output of multiplying device K whereas there would be such body bending signal passing from multiplying device $(1-K)$. The integrating means of FIGURE 2 would therefore operate. If the multiplying device K were a conventional voltage dividing potentiometer, for example, the motor 40 would operate a slider of such potentiometer to the maximum output. On the other hand the reverse effect would be had on multiplying device $(1-K)$ which would have its output reduced so that ultimately there would be no output from the multiplying device $(1-K)$ and the entire useable output would be from multiplying device K. On the other hand, if the aft gyro 16 were over the shifted position of the antinode $a$, the integrator 40 would operate so that the useable output to the control system would be from multiplying device $(1-K)$.

For intermediate changes in position of the antinode $a$ that is between one extreme where the antinode is adjacent a rate gyroscope 10 or 16 and in the other position where the two rate gyroscopes are equally displaced from the antinode $a$, the electronic integrator will be operated in accordance with the mathematical analysis. In other words, if the blender has been set up by the selected adjustment of $K_1$ so that $\lambda'_1$ is to be positive, then for such intermediate positions of the antinode, the blender will operate so that $\lambda'_1$ will always be positive.

As evident from the Equation $f$ the blender tends to increase the contribution of the gyroscope 10 or 16 whose output has been reduced due to the change in longitudinal position of the antinode and tends to decrease the contribution of the gyroscope whose output has been increased due to such longitudinal change in position of the antinode $a$.

It will now be apparent that there has been provided a novel blender responsive to plural flight condition sensing devices in an aircraft of the aeroelastic type which blender may be utilized to effect, if desired, a rigid body output but may be alternatively adjusted to give an output containing either positive or negative body bending effects. While many changes could be made in the above construction, and while different embodiments of this invention could be made without departing from the scope thereof, it is intended that the above description taken with the accompanying drawings shall be interpreted as illustrative and not in a limiting sense.

What is claimed is:

1. In an aeroelastic-type aircraft having a control surface for moving the craft about an axis, control apparatus including servo means operating said surface; a first craft angular rate condition signal providing sensing means spaced from a bending mode antinode of said craft; a second craft angular rate condition signal providing sensing means spaced from said antinode but on the opposite side thereof from said first sensing means; means combining the outputs of both sensing means, to oppose in said combining means the body bending effects on the two sensing means; and further means variably controlling said servo means in accordance with the magnitude of output from said combining means.

2. The apparatus of claim 1, and means for varying the relative proportions of the signals supplied by the first and second means to the combining means to thereby include a body bending effect from the combining means to the servo means.

3. The apparatus of claim 1; wherein the body bending mode is in the direction of the longitudinal axis of the aircraft.

4. A gyroscope arrangement output blender for obtaining in effect with respect to a bending mode a rigid body motion output signal, comprising: a first rate gyroscope spaced from an antinode of the body in one direction; a second rate gyroscope spaced from the antinode in an opposite direction; and means combining the response of the two gyroscopes and opposing the effect due to bending of said body for said mode, to thus obtain in effect a rigid body motion response.

5. The apparatus of claim 4; with means for filtering the desired bending mode frequency prior to opposing the effects and thus discriminate other body bending frequencies.

6. In an adaptive autopilot control system for an aircraft said system having a gain changer for controlling the magnitude of residual oscillations of a servomotor means therein, means for supplying to said system a blended craft angular rate signal to compensate for body bending effects of the craft which said system controls, comprising: a first rate gyroscope spaced in one direction from an antinode of a bending mode of the craft; a second rate gyroscope spaced in the opposite direction from the antinode; and means combining the effects of said rate gyroscopes and controlling said system.

7. In a control system for an aircraft having a control surface for changing attitude thereof, means for supplying to said system a control surface positioned varying control signal to compensate for body bending effects of the craft which said system controls comprising: a first flight condition signal providing sensor spaced in one direction from an antinode of a bending mode of the craft, said signal having two in phase components one due to the flight condition effect the other due to the body bending effect; a similar flight condition signal providing sensing device spaced in the opposite direction from the antinode, said signal having two out of phase components one due to the flight condition effect the other due to the body bending effect; and means combining the signals of said flight condition sensing devices to provide the position varying control signal and controlling said system.

8. In a flight control system for an aircraft having attitude changing means thereon and servo means operating said attitude changing means, means for supplying to said system for controlling said servomotor a blended rate signal to compensate for body bending effects of the craft which said system controls, comprising: a first rate gyroscope spaced in one direction from an antinode of a bending mode of the craft; a second rate gyroscope spaced from the antinode in the opposite direction; and means combining the effects of said rate gyroscopes in response to movement of the craft about a body axis thereof causing said body bending effect and controlling said system.

9. In flight control apparatus for an aircraft of the aeroelastic type, in combination: a first signal generator comprising a rate gyroscope spaced forwardly of an antinode of a bending mode of the craft; a second signal generator comprising a rate gyroscope spaced rearwardly of the antinode; a first multiplier for the first signal generator; a second multiplier for the second signal generator; a further attenuator receiving the output from the first multiplier; a first band-pass filter connected to the attenuator; a second band-pass filter connected to the second multiplier; individual means rectifying the outputs of the band-pass filters; summing means combining the outputs of the rectifying means; integrating means responsive to the summing means; adjusting means for the first and second multipliers positioned by said integrating means; and additional means supplying outputs from the first and second multipliers to said control apparatus.

10. A gyroscope output blender comprising: a first rate gyroscope spaced from a point in the body which is a known direction and distance from a bending node; a second rate gyroscope spaced from the point but in an opposite direction than the first rate gyroscope, and means combining the response of the two gyroscopes to thus obtain a signal effect wherein at least a portion of the body bending effect on said signal is cancelled.

11. A gyroscope output blender for obtaining an effect including both a rigid body motion effect and a body bending effect comprising: a first rate gyroscope spaced from an antinode of the body; a second rate gyroscope spaced from the antinode but in an opposite direction therefrom than the first rate gyroscope, a gain device responsive to the output of the first gyroscope, a second gain device responsive to the output of the second rate gyroscope, a logic arrangement responsive to the output from both gain changers for adjusting the same in accordance with the difference of the outputs of said two gain changers, to compensate for change in longitudinal position of the antinode of such body.

12. In a control apparatus, for an object capable of departing from a predetermined flight condition, control means only effective to detect departures of a craft from a selected flight condition and to exert an action on the object as to restore the same to the predetermined flight condition; a pair of means each responsive to the rate of change of the flight condition; means for combining the outputs of said rate responsive means and connected to said control means; a multiplying means for each rate responsive means, said rate responsive means being on opposite sides of a position in said object; and means controlling said multiplying means and responsive thereto for modifying the output supplied to said combining means.

13. A gyroscope arrangement output blender for obtaining in effect with respect to a bending mode a rigid body motion output signal, comprising: a first rate gyroscope spaced from an antinode of the body in one direction; a second rate gyroscope spaced from the antinode in an opposite direction; a filtering means separately responsive to each gyroscope; means jointly responsive to the two filters modifying the responses of the two gyroscopes; and means for combining the two modified responses to obtain a signal in accordance with the rigid body motion.

14. Apparatus for deriving a signal solely in accordance with a function of a change in position of a rigid body from a body subject to deformation while undergoing a change in position, comprising: a first sensor spaced in one direction from an antinode of the deformed body providing upon change in position of the body a first signal in accordance with a function of a change in position; a second sensor spaced in an opposite direction from the antinode providing a second signal in accordance with the function of change in position of the body; a first filter receiving the signal from the first sensor; a second filter receiving the signal from the second sensor; means responsive to said filters obtaining a difference of the outputs of said filters and inversely modifying the magnitudes of the first and second signals; and means combining the modified signals.

15. Apparatus for canceling the effects of body bending thereby deriving a signal solely in accordance with a function of the change in position of a rigid craft comprising: a first sensor spaced in one direction from an antinode of a bending mode of the craft providing a signal affected by the body bending and a function of the change in position of the craft; a second sensor spaced in the opposite direction from the antinode providing a second signal affected by the body bending and the function of the change in position of the craft; a first filter receiving the signal from the first sensor; a second filter receiving the signal from the second sensor; means controlled by the difference of outputs from both filters inversely modifying the magnitudes of the first and second signals; and means combining the modified signals.

References Cited in the file of this patent

UNITED STATES PATENTS

| | | |
|---|---|---|
| 2,487,793 | Esval | Nov. 11, 1949 |
| 2,832,551 | Gille | Apr. 29, 1958 |